A. M. CRAIG.
APPARATUS FOR TREATING METALS AND THEIR ALLOYS.
APPLICATION FILED NOV. 21, 1916.
Patented Nov. 6, 1917.
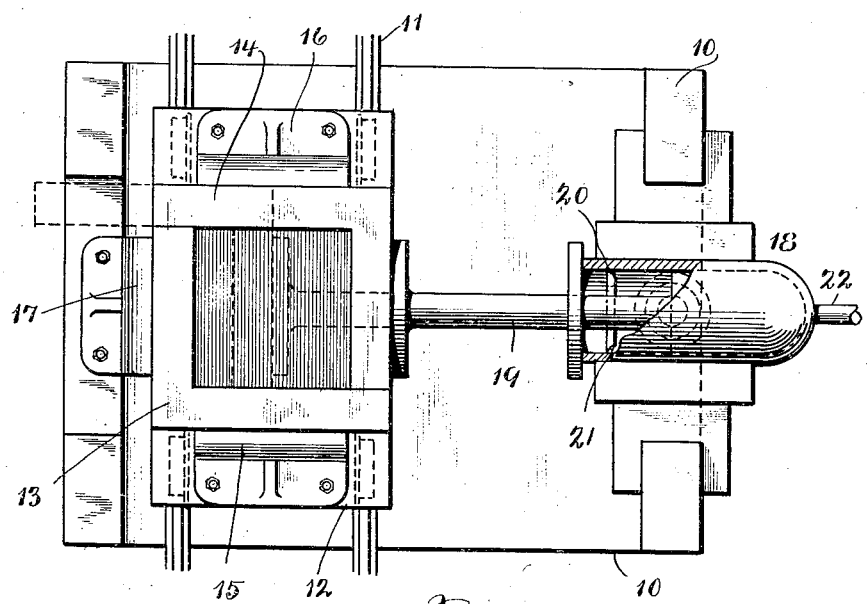
Fig. 1.
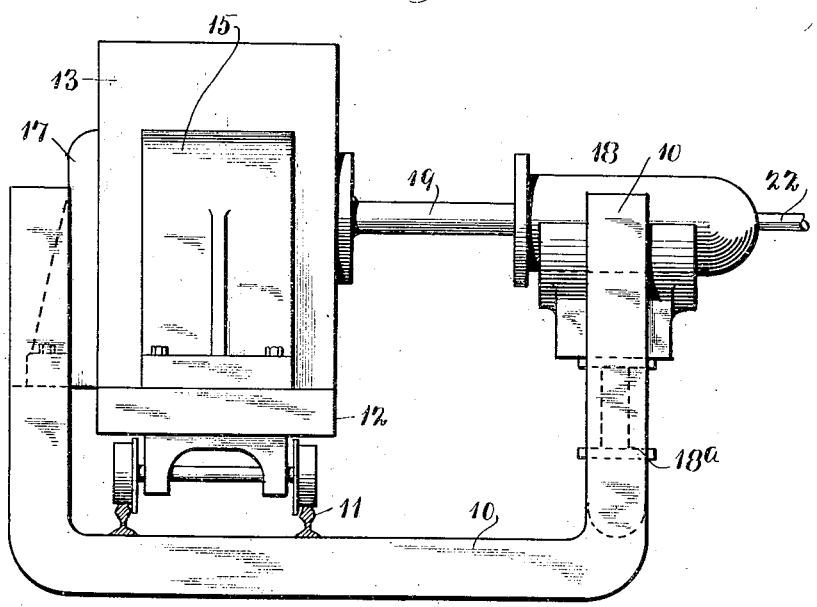
Fig. 2. Alvin M. Craig, Inventor.
By his Attorney,
W. P. Hutchinson.

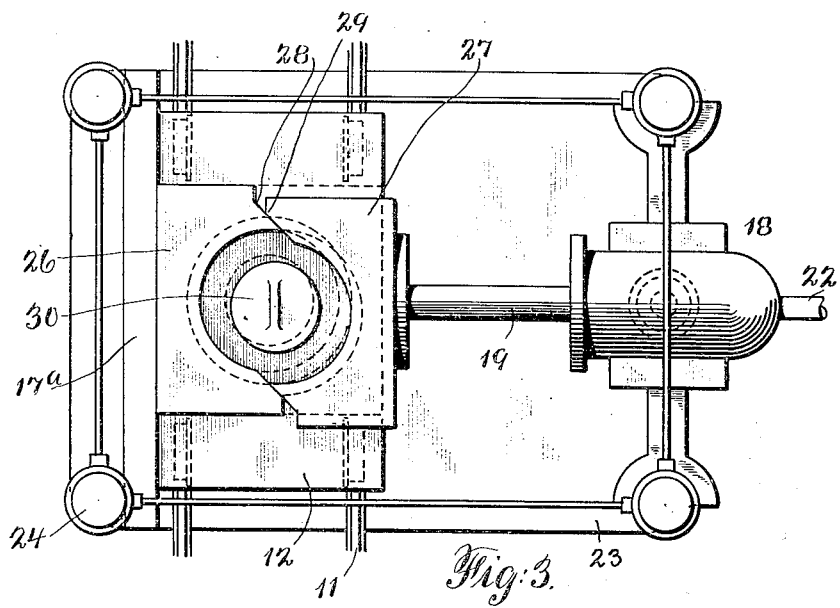
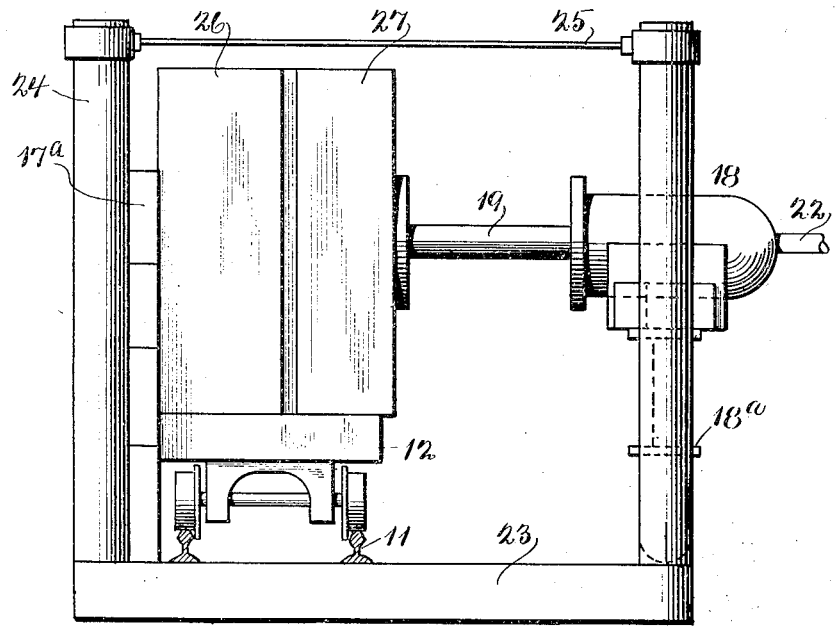

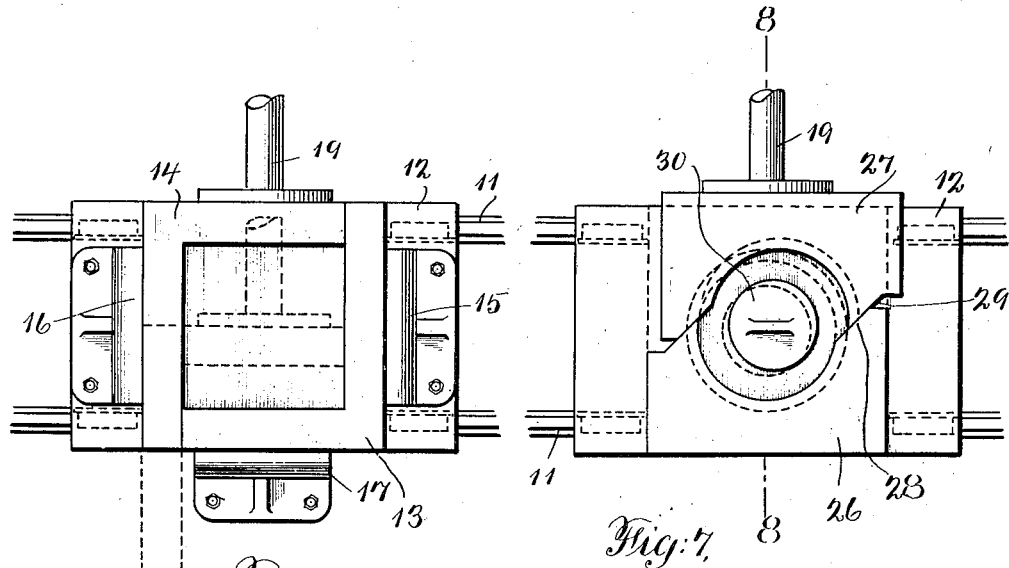
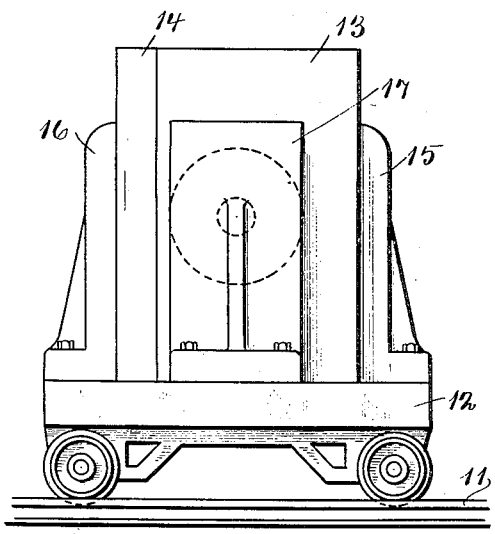
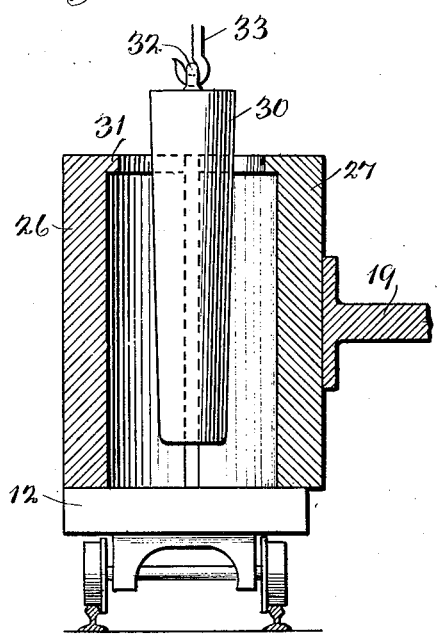

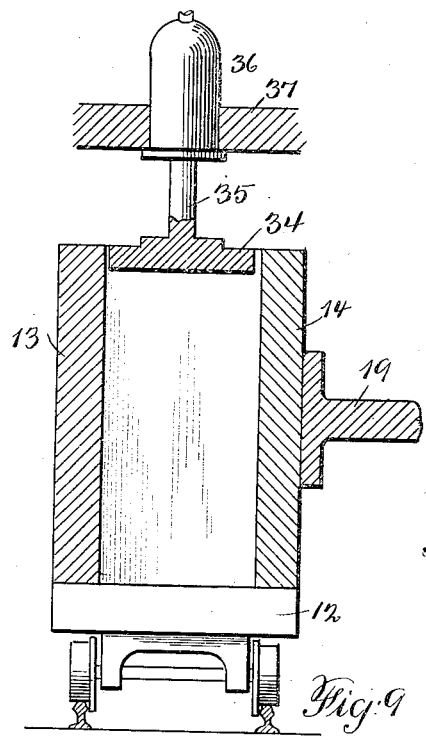
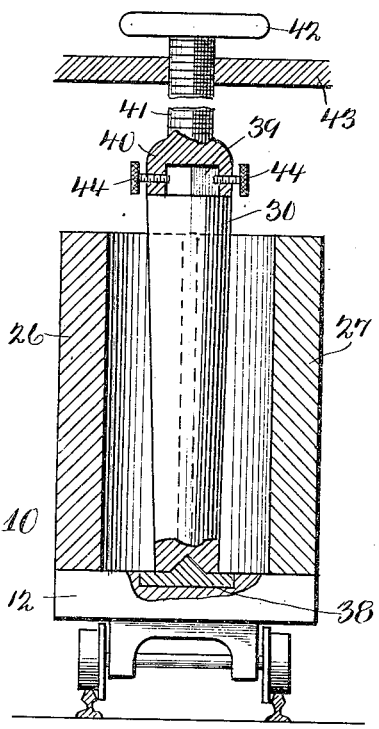
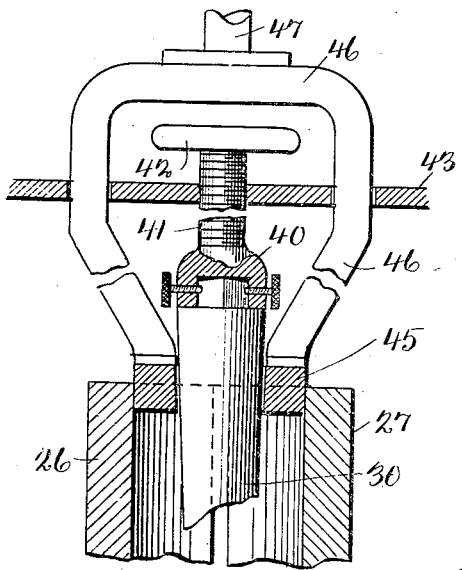
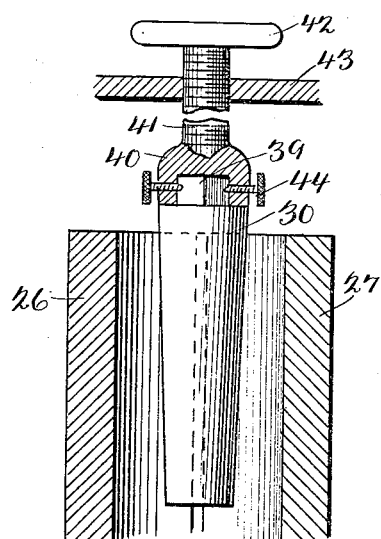

UNITED STATES PATENT OFFICE.

ALVIN M. CRAIG, OF NEW HAVEN, CONNECTICUT.

APPARATUS FOR TREATING METALS AND THEIR ALLOYS.

1,245,687.  Specification of Letters Patent.  Patented Nov. 6, 1917.

Application filed November 21, 1916. Serial No. 132,517.

*To all whom it may concern:*

Be it known that I, ALVIN M. CRAIG, a citizen of the United States, and a resident of the city of New Haven, county of New Haven, and State of Connecticut, have invented a new and useful Improvement in Apparatus for Treating Metals and Their Alloys, of which the following is a full, clear, and exact description.

My invention relates to improvements in an apparatus for casting and compressing steel and other metals and their alloys, and the object of my invention is to produce an apparatus by which a charge soon after being poured can be subjected to heavy, unyielding, incremental pressures so that the resulting mass can be very much condensed and compressed, thereby giving a greatly increased tensile strength, powers of resistance, and making it generally stronger and adapted for purposes for which ingots formed in the ordinary way can be used. My invention is especially intended for operating upon steel masses, but it can be used for the treatment of certain other metals and alloys thereof. Steel when first poured acts differently from cast iron, as it does not expand in the first instance like an iron charge, and it can be compressed quickly and under great pressure without injuring the grain of the metal. An object of my invention is to arrange the apparatus so that the charge can be conveniently handled and compressed, and further to construct the mold members so that they will slide upon each other when the charge is under compression, thereby permitting pressures to be applied to the charge. Furthermore as this system is valuable for use in the manufacture of heavy ingots, I form a portable mold in which a car is used to transport the mold and its charge, and in which the top of the car forms the bottom of the mold so that the mold members can be freely moved thereon in the act of compressing the charge.

My invention is also intended to apply to the manufacture of metal products in which cores are necessary, and I provide special means for compressing around the core and for removing the core, and I also provide for compressing the charge in all directions so that the resulting product is solid, free from pipes, blow-holes or other imperfections, besides being of extraordinary toughness, and partaking of the nature of steel forgings. This apparatus is also especially intended to carry into effect the method disclosed in my application for Letters Patent of the United States No. 132,518, filed November 21, 1916, for a process for treating metals and alloys of metals.

Reference is to be had to the accompanying drawings forming a part of this specification, in which similar reference characters indicate corresponding parts in all the views.

Figure 1 is a plan view of one form of the apparatus embodying my invention, a part of the hydraulic jack or ram being broken.

Fig. 2 is a side elevation of the structure shown in Fig. 1.

Fig. 3 is a plan view of the apparatus with a slightly modified form of holding frame, and showing a mold adapted for a cylindrical casting.

Fig. 4 is a side elevation of the construction shown in Fig. 3.

Fig. 5 is a detail plan of a rectangular mold.

Fig. 6 is a side elevation of the structure shown in Fig. 5.

Fig. 7 is a plan of a member for making a heavy cylindrical casting, showing the core in position.

Fig. 8 is a cross section on the line 8—8 of Fig. 7, the core being shown in elevation.

Fig. 9 is a sectional elevation of a mold showing means for compressing the charge in all directions.

Fig. 10 is a sectional elevation of a mold showing the means for centering and supporting the core.

Fig. 11 is a broken sectional elevation showing means for compressing a charge transversely around the core and also longitudinally of the core.

Fig. 12 is a sectional elevation of a mold showing means for supporting a core of less length than the mold.

Figure 13:
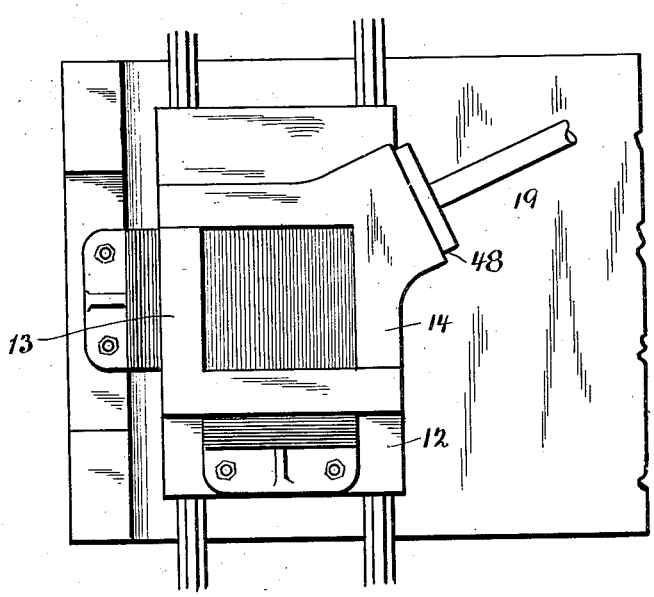
Fig. 13 is a plan of a slightly modified form of mold for making a rectangular ingot.

The apparatus is provided with a suitable supporting frame for the compression means, and for this purpose a generally U shaped frame 10 can be used, and the tracks 11 which carry the mold can be laid through the frame so that the mold on the car 12 can be conveniently brought into the frame 10 ready for the charge to be compressed. I prefer to use a car for large castings, and the top 12 of the car forms the bottom of the mold which when the casting is to be rectangular, comprises two members 13 and 14, each having walls at right angles to each other, so that when put together as in Figs. 1 and 5, a rectangular mold is formed, and it will be noticed that one arm of the member 14 overlaps the adjacent side wall of the member 13, while the second wall of the member 13 overlaps the adjacent wall of the member 14, so that when pressure is applied as shown in Fig. 1, the charge can be squeezed to the limit desired without the molds coming into abutting opposition. This arrangement insures an even pressure which as stated can be carried out to any extent.

On the car 12 are abutment guides 15 and 16 which rise on opposite sides of the mold, and these can be placed so as to fit the mold as in Fig. 5, or space can be left between one of the brackets or abutments and the wall of the mold so that metal plates can be filled in to serve as a guide, as shown in Fig. 4, where the plates 17$^a$ form an abutment for one wall of the mold. Behind one wall of the mold is also placed an abutment 17 which is a part of the frame 10, or as stated, plates or other form of abutment can be substituted without affecting the invention.

Pressure is applied by a hydraulic jack 18 which preferably alines with the abutment 17, and the piston rod of the jack abuts with one wall of a mold member, such member being 14 as shown in Fig. 1. It will be seen that when pressure is applied the charge will be compressed, the mold sides sliding upon one another freely, and in this way being essentially different from the ordinary type of plunger compressor.

If desired one of the side guides can be dispensed with and the pressure applied obliquely as shown in Fig. 13, so that the charge will be compressed and the mold member 14 will slide along the member 13. The jack 18 is suitably supported in one side of the frame 10, and it can be raised and lowered by means of another jack 18$^a$ or other suitable mechanism for vertically adjusting the jack. Any suitable form of hydraulic jack can be used but I prefer to have the cylinder of the jack provided with a collar 20 and with a flap valve 21 behind the collar so that when the water enters the cylinder it will push the valve against the collar and prevent the water from passing out from around the piston rod. This valve is shown conventionally, and any suitable valve can be used. The water is admitted as usual through a pipe 22, and the amount of pressure can be regulated in the customary manner by the pump which supplies the water.

In Figs. 3 and 4 I have shown a slightly modified form of frame support for the casting apparatus, and also the application of the apparatus to a cylindrical mold in which a core is used. As here shown the frame has a base 23 with posts 24 rising therefrom, these being connected by cross ties 25, and the car 12 which is shown in position in the frame, carries a two part mold 26 and 27 adapted for the kind of casting referred to. These mold members have inclined meeting edges 28 and 29 adapted to slide one on the other, and when the mold is open for the charge it will be seen that the chamber of the mold is not circular in cross section, but when pressure is applied and the charge compressed, the mold members slide one on the other until the charge assumes the proper cylindrical shape. It will be seen that the principle is exactly the same as in casting a rectangular mass, and it will be understood from the two illustrations that the molds can be made in various forms to suit different castings, so long as the principle is preserved of having them slide freely upon each other.

In the mold shown in Figs. 3 and 4, a core 30 is suspended, and this can be accomplished in several ways without affecting the principle of the invention. For instance, in Figs. 7 and 8, I have shown a core 30 suspended between the members 26 and 27, and it will be noticed by reference to the figures that the mold 26—27 has preferably inturned flanges 31 at the top so that when the core is removed the charge will not be disturbed or stripped, but will be retained by the flanges.

The core 30 can be provided with a staple 32 to which a hook 33 may be attached, and the core lifted by any suitable hoisting apparatus, or the means shown in Figs. 10 to 12, and hereinafter referred to, can be used if preferred.

It is sometimes desirable to compress the charge endwise as well as laterally, and for the rectangular form I have shown in Fig. 9 an appropriate means of accomplishing this result. Here a platen 34 is arranged in the top of the mold and is smaller than the cross section of the mold so as to provide for the condensation of the charge, and is also connected with the piston rod 35 of the hydraulic jack 36 which is carried by suitable framework 37, so that as the charge is compressed transversely between the members 13 and 14, it can also be compressed in other directions by the platen or piston 34.

In Figs. 9 to 12, I have shown other means for supporting a core and in Fig. 11 means for compressing the charge endwise around the core. The invention is not limited, however, to the means shown. The core 30 can be socketed at the bottom and centered on a support 38 in the top of the car, that is the bottom of the mold as shown in Fig. 10, and at the top the core can be squared as shown at 39 and entered in a socket 40 carried by a screw 41 having a hand wheel 42 turning in a supporting frame 43. The core can be held in its socket by binding screws 44, or any other suitable form of clamp can be substituted for the parts 40 and 44. This arrangement holds the core central of the mold, and when the core is to be removed it can be loosened by the screw 41, then released from the clamp and afterward lifted from the casting.

If it is desired to have the charge flow around one end of the core, the core can be suspended as in Fig. 12, in which case the part 38 is dispensed with.

When it is desired to compress the charge endwise around the core, a ring 45 can be provided which will enter between the side members of the mold and the core itself, and this ring can be connected with a yoke 46 which slides through the support 43, straddles the screw 41, and abuts with the piston rod 47 of a suitable shaft.

Figure 14:
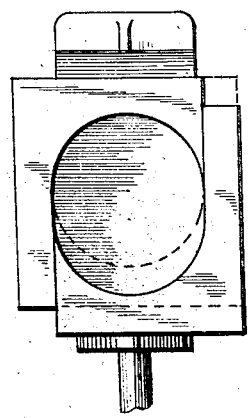
Fig. 14 is a slightly modified form of mold for compressing a cylindrical ingot.

Fig. 14 shows a plan of a mold constructed to form a cylindrical mass, the sides of the mold being of the shape and construction of those shown in Fig. 1, but the corners between the mold sides are solid and have curved surfaces so that when the sides of the mold are moved one upon the other, the curved sides will come in contact with each other, thereby forming the charge into a mass, of cylindrical shape.

Figure 15:
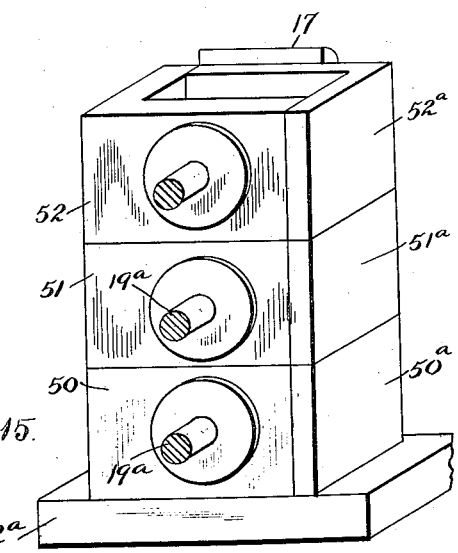
Fig. 15 is a detail showing the construction and arrangement of the movable portion of a mold for use in forming long ingots.

In producing a casting of considerable length it is desirable to use a mold such as shown in Fig. 15, made up of a series of sections so that the pressure can be applied to the charge as it fills up the mold. Otherwise the lower part of the charge may have time to chill before pressure is applied, and it is difficult to get an even compression on all parts of the casting and a satisfactory result. As shown the several sections 50, 51 and 52 are arranged as already described to move with relation to their complementary sections 50ª, 51ª and 52ª. They are superposed, the lower sections sliding on the base 12ª and the movable sections being connected with pistons 19ª while the opposite sections are backed by the abutment 17 as hereinafter described. It will be seen that with the mold arranged in this way the pressure can be applied to the lower mold section as soon as this section is full, or shortly after, and as the mold is filled the pressure can be successively applied to the several sections of the charge so that an even result is obtained on the finished casting, that is to say the pressure can be applied in this sectional manner to the charge when it is in just the desired condition of plasticity throughout. It will be further noted that this arrangement is the same in principle as that shown in the other views, and that it is simply the superposing of the mold sections and the successive application of pressure to them.

From the foregoing description it will be seen that I have provided a very convenient means by which powerful pressure can be applied to castings, that the pressure can be applied as soon as desirable after the charge is poured, and can be carried out to any desired extent, as the mold members slide freely upon each other and also slide freely on the mold bottom, and while it is desirable to have the top of the car form the mold bottom, it will of course be understood that this is not essential except in the case of large molds which are difficult to handle by ordinary means. It will also be understood that while I have shown a certain type of hydraulic jack for effecting the incremental compression, and certain means for removing the core, these parts can be changed and others substituted without affecting the invention in any way.

What I claim as new and desire to secure by Letters Patent, is:

1. In an apparatus of the kind described, a mold comprising a base, and opposed side members slidable on the base and upon each other.

2. In an apparatus of the kind described, the mold comprising a flat base, and upright side members slidable on the base and upon each other thereby permitting unlimited compression of the charge.

3. An apparatus of the kind described comprising a flat base forming the mold bottom, opposed side members of the mold arranged to slide on the base and upon each other thereby permitting compression of the charge, and a compression piston entering the mold top.

4. An apparatus of the kind described comprising a flat base, a mold to receive the charge mounted on said base, said mold comprising opposed members sliding freely on the base with the side portion of one member of the mold sliding freely past the adjacent portion of the opposite member of the mold, and means for applying compression to the mold members.

5. An apparatus of the kind described comprising a mold having opposed side members movable freely one upon the other and arranged in series one above the other, and means for applying pressure successively from the lower to the upper members of the mold.

6. An apparatus of the kind described comprising a flat base and a series of superposed and opposed members forming the sides of a mold mounted on said base and slidable one on the other, and with the side members of the molds movable freely upon each other, and means for applying pressure to the several mold sections.

7. A compression mold of the kind described having a plurality of superimposed sections each independently and laterally movable.

8. An apparatus of the kind described comprising a portable base forming a mold bottom, and side members perpendicular to the base and sliding thereon, said members being arranged to slide freely upon each other thereby permitting compression of the charge.

9. In a structure of the kind described the mold comprising a car, the top of which forms the bottom of the mold, and opposed members forming the mold sides, said members being supported on the car and sliding freely upon each other thereby permitting unlimited compression of the charge.

10. An apparatus of the kind described comprising a car having a flat top forming the bottom of a mold, opposed members slidable on the car and forming the mold sides, said members being arranged to slide upon each other, and means for forcibly moving the said side members with relation to each other.

11. An apparatus of the kind described comprising a car, a mold supported on the car and having side members arranged to slide upon each other, guides on the car for the mold, an abutment for the back of the mold, and means for applying pressure to the front of the mold.

12. An apparatus of the kind described comprising a car having a flat top forming the bottom of a mold, opposed side members movable on the car top and arranged to slide upon each other, guides on the car to support the mold, and means for forcibly moving the mold sections with relation to each other.

13. An apparatus of the kind described comprising a portable flat base forming the bottom of a mold, side members of the mold erected on the base and slidable thereon, the said members being arranged to slide upon each other, and means for applying hydraulic pressure to the sides of the mold.

14. An apparatus of the kind described comprising an open frame having essentially vertical sides, a portable mold independent of and unattached to the frame and adapted to be moved bodily into and out of the frame, said mold having opposed side members sliding freely upon each other to permit unlimited compression of the charge, an abutment for the back of the mold, and a hydraulic jack carried by the frame and arranged to press against one of the mold sides.

15. An apparatus of the kind described comprising an open framework, a portable mold adapted to enter the framework and having opposed side members arranged to slide freely upon each other, an abutment for the back of the mold, a hydraulic jack supported in the framework and impinging against the front of the mold, and means for vertically adjusting the hydraulic jack.

16. An apparatus of the kind described comprising a supporting framework, a track entering the framework, a car running on the track and having a flat top forming the bottom of a mold, opposed side members of the mold slidable on the car top and movable freely upon each other, and means for applying hydraulic pressure to the mold sides.

17. An apparatus of the kind described comprising a flat base, opposed members forming the sides of a mold and slidable on the base, said members being arranged to slide freely upon each other, means for guiding the side members, and means for applying hydraulic pressure to the said side members.

18. An apparatus of the kind described comprising a car having a flat top forming the bottom of the mold, opposed side members of the mold slidable on the car top and movable freely upon each other, means for guiding the said members, means of applying hydraulic pressure to the said members to force them together, and a compression piston movable longitudinally between the said members.

ALVIN M. CRAIG.

Witnesses:
 WARREN B. HUTCHINSON,
 M. G. O'DONNELL.